United States Patent
Kuhn et al.

(10) Patent No.: US 9,699,312 B2
(45) Date of Patent: Jul. 4, 2017

(54) SYSTEMS AND METHODS FOR DESKTOP DATA RECORDING FOR CUSTOMER AGENT INTERACTIONS

(71) Applicant: Envision Telephony, Inc., Seattle, WA (US)

(72) Inventors: Rodney Kuhn, Seattle, WA (US); Ron Strandin, Woodinville, WA (US); John Rake, Bellevue, WA (US); Daniel Ebenezer Arun Thomas, Bellevue, WA (US); Dan Struthers, Federal Way, WA (US); Dennis Kelly, Snohomish, WA (US); Brian Baxter, Kent, WA (US); Jason Javan, Federal Way, WA (US)

(73) Assignee: Envision Telephony, Inc., Seattle, WA (US)

( * ) Notice: Subject to any disclaimer, the term of this patent is extended or adjusted under 35 U.S.C. 154(b) by 223 days.

(21) Appl. No.: 14/540,912

(22) Filed: Nov. 13, 2014

(65) Prior Publication Data
US 2015/0131792 A1    May 14, 2015

Related U.S. Application Data

(60) Provisional application No. 61/903,833, filed on Nov. 13, 2013.

(51) Int. Cl.
| | |
|---|---|
| *H04M 3/00* | (2006.01) |
| *H04M 5/00* | (2006.01) |
| *H04M 3/51* | (2006.01) |
| *H04M 3/42* | (2006.01) |

(52) U.S. Cl.
CPC ..... *H04M 3/5191* (2013.01); *H04M 3/42221* (2013.01)

(58) Field of Classification Search
CPC .................................................. H04M 3/42221
USPC ..................................................... 379/265.06
See application file for complete search history.

(56) References Cited

U.S. PATENT DOCUMENTS

| | | | |
|---|---|---|---|
| 8,401,155 B1 * | 3/2013 | Barnes ..................... | H04M 3/51 370/352 |
| 2003/0208564 A1 * | 11/2003 | Miyake ............. | G06F 17/30244 709/219 |
| 2006/0168188 A1 | 7/2006 | Dutton | |
| 2008/0208579 A1 * | 8/2008 | Weiss ..................... | G06Q 30/02 704/244 |

(Continued)

*Primary Examiner* — Nafiz E Hoque
(74) *Attorney, Agent, or Firm* — Lowe Graham Jones PLLC (57) ABSTRACT

Methods and systems for data recording for customer-agent interactions are described. The described system may include a Desktop Data Recording Client ("DDRC"), which is an application or other module installed on an agent's computing system or device that collects and records various data types from a computer desktop and telephone during a phone or electronic interaction with a third party, such as a customer. The DDRC can be configured to stop and restart data collection and recording of sensitive data for security purposes to ensure that this type of data is not stored or retrievable. The specific data types that may be collected and recorded include: voice recording, computing device screen capture, desktop data collection at a summary and/or detailed level and in call-based on continuous modes, and recording start/stop indications.

18 Claims, 11 Drawing Sheets

(56) References Cited

U.S. PATENT DOCUMENTS

2008/0240404 A1   10/2008  Conway et al.
2011/0218798 A1*  9/2011  Gavalda .................. G06F 17/30
                                                  704/201
2013/0016115 A1*  1/2013  Minert .................... G06Q 10/06
                                                  345/589

* cited by examiner

3100: A process for recording information about a customer-agent interaction

3101: at a computer operated by an agent who is interacting with a customer, recording the customer-agent interaction that includes a voice communication between the agent and the customer, by:

3102: recording voice data associated with the interaction

3103: recording screen data obtained from a display of the computer as it is used during the interaction by the agent 3104: recording desktop data associated with the display of the computer 3105: upon termination of the interaction, transmitting the recorded voice data, screen data, and desktop data to a remote server for storage

Fig. 3.2

3200: The process of 3100, wherein the recording the customer-agent interaction includes:

3201: controlling the recording based on rules that specify actions to be taken upon the occurrence of specified events

Fig. 3.3

*3300*: The process of *3100*, wherein the recording voice data includes:

*3301*: obtaining the voice data from an audio device that is local to the computer operated by the agent

Fig. 3.4

*3400*: The process of *3100*, wherein the recording screen data includes:

*3401*: obfuscating sensitive information shown in the screen data by blurring, blocking, or redacting at least a portion of the screen data

Fig. 3.5

*3500*: The process of *3100*, wherein the recording desktop data includes:

*3501*: recording indications of window interactions performed by an agent with respect to a graphical user interface displayed on the display of the computer, the indications including window names, field names, and data inputs initiated by the agent

Fig. 3.6

3600: The process of 3100, wherein the transmitting the recorded voice data, screen data, and desktop data includes:

3601: determining whether or not the remote server is available

3602: when the remote server is available, transmitting the data to the remote server

3603: when the remote server is not available, locally caching the data until the remote server becomes available at a later time

Fig. 4

SYSTEMS AND METHODS FOR DESKTOP DATA RECORDING FOR CUSTOMER AGENT INTERACTIONS

CROSS-REFERENCE TO RELATED APPLICATION

This application claims the benefit of U.S. Provisional Application No. 61/903,833, filed Nov. 13, 2013, the contents of which are incorporated herein by reference in its entirety.

FIELD OF THE INVENTION

The present disclosure relates to methods, techniques and systems for data recording for customer-agent interactions and, more particularly, to desktop or mobile computing device based recording of voice, screen and other data related to the interaction between an agent and a customer.

BRIEF DESCRIPTION OF THE DRAWINGS

Preferred and alternative examples of the present invention are described in detail below with reference to the following drawings:

FIGS. 3.1-3.6 are example flow diagrams of data recording processes performed by example embodiments.

DETAILED DESCRIPTION

Embodiments described herein provide enhanced computer- and network-based methods and systems for data recording for customer-agent interactions and, more particularly, to desktop or mobile computing device based recording of voice, screen and other data related to the interaction between an agent and a customer. In a typical business environment, human agents interact with callers (e.g., customers or clients) by way of telephone conversation, chat, email, or other communication mechanisms. Some embodiments provide a Desktop Data Recording Client ("DDRC"), which is an application or other module installed on an agent's computing system or device that collects and records various data types from a computer desktop and telephone (when applicable) during a phone or electronic interaction with a third party. In addition, the DDRC can be configured to stop and restart data collection and recording of sensitive data for security purposes to ensure that this type of data is not stored or retrievable. The specific data types that may be collected and recorded include: voice recording, computing device screen capture, desktop data collection at a summary and/or detailed level and in call-based on continuous modes, and recording start/stop indications. Upon the conclusion of an interaction with a third party, the DDRC stores all of the recorded/collected data in addition to any metadata as a single interaction for future review and analysis.

A. Desktop Data Recording Environment Overview

Figure 1:
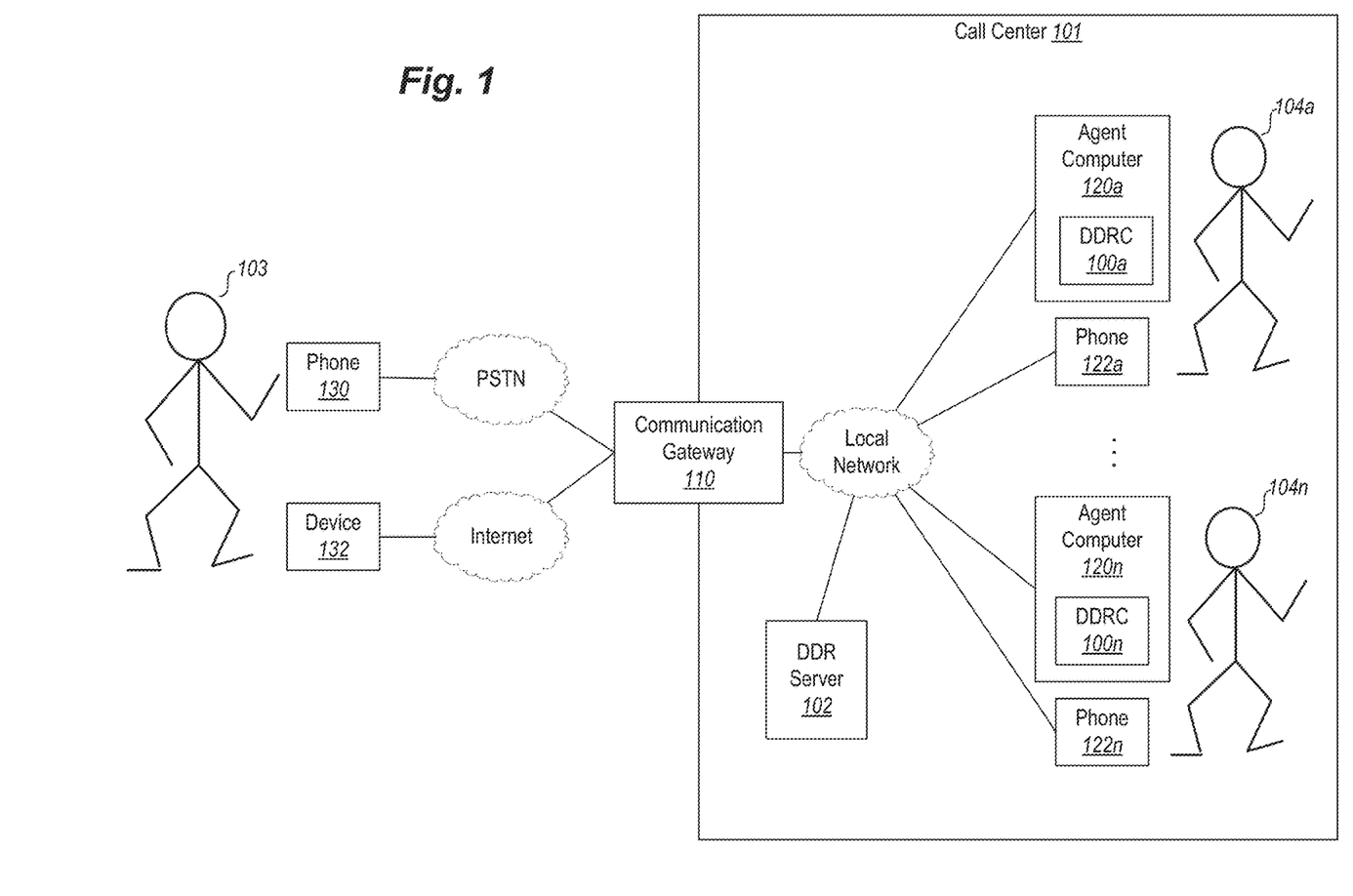
FIG. 1 is a block diagram of a call center environment according to an example embodiment.

FIG. 1 is an example block diagram of a call center environment according to an example embodiment. FIG. 1 illustrates a call center 101 that includes multiple agents 104a-104n that are each using a corresponding computer 120a-120n and telephone 122a-122n. Each computer 120 is executing a corresponding Desktop Data Recording Client ("DDRC") 100a-100n. The computer 120 may be any kind of computing system or device, including a desktop computer, laptop computer, smart phone, tablet, or the like. The call center 101 further includes a communication gateway 110 that is configured to facilitate communication between agents 104 and outside parties, such as by processing telephone calls, chats, emails, or the like, between the call center 101 and external communication networks, including the PSTN (Public Switched Telephone Network), Internet, or other networks/services. The call center 101 may also include a Desktop Data Recording Server ("DDRS") 102 configured to facilitate and/or orchestrate the operation of the DDR clients 100a-100n, such as by providing centralized configuration/management facilities, remote storage services, or the like.

In a typical interaction, a caller 103 places a call using a telephone 130 via a telephone network (e.g., PSTN). The communication gateway 110 receives the call and routes it to one of the agents 104a-104n, where it is picked up by the corresponding telephone 122a-122n, thus beginning an agent-caller interaction. During the duration of the agent-caller interaction, data associated with the agent-caller interaction is then recorded by the DDRC 100, as described in detail below. When the interaction terminates (e.g., the caller hangs up), the DDRC 100 stores the recorded information, either locally (e.g., on a disk or other data repository of the corresponding computer 120) or remotely, such as on the DDR server 102.

Note that other communication mechanisms may also or instead be supported. For example, in other scenarios, the caller 103 may communicate via some other device 132 (e.g., a laptop computer, a mobile device) that is configured to facilitate a voice communication (e.g., voice chat, VoIP call), text communication (e.g., chat session), or similar via a packet switched network, such as the Internet.

Note also that while the techniques are described herein primarily with respect to agents interacting with customers, such as operating within a call center environment, the described techniques may be applied in other contexts. For example, the techniques are equally applicable for agents who are not operating within a traditional, physical call center, and are instead working in a distributed or virtual call center, at remote locations, and/or using mobile devices to interact with customers or other third parties. As another example, desktop recording may be used with other types of users who may be required (or otherwise desire) to record interactions with clients, such as government officials, doctors, attorneys, or the like.

1. Voice Recording

The inbound and outbound voice streams of a telephone conversation are recorded as an audio file when the agent answers an incoming phone call or when they initiate an outbound phone call. The recording of the telephone conversation is accomplished on the agent desktop and therefore is a departure from earlier technologies that rely on capturing the audio using station-side or trunk-side taps or service-observe line-boards on the PBX for TDM and RTP-forking or port-mirroring or Voice-VLANs for VoIP along with CTI events/data. The recording is accomplished for the following technologies:

VoIP softphones: The softphone application is running on the desktop and thus the audio devices on the desktop are used for sending and receiving the voice signal. Recording the audio device accomplishes these steps. Alternatively, the recording can be accomplished by recording and converting the RTP destined to and originating from the softphone into audio files. Voice recordings on VoIP softphones is not dependent on a physical proximity to the company phone system and thus supports both on premise and remote or mobile agents.

VoIP hardphones: These instruments are generally used in close proximity to the desktop. To record telephone calls, the signaling (e.g., SIP, H.323, SCCP/Skinny) and the voice signal (RTP) need to be made available to the desktop. Voice recordings on VoIP hardphones is not dependent on a physical proximity to the company phone system and thus supports both on premise and remote or mobile agents. This is accomplished using one of three methods:

1. The first is required if the desktop and phone are connected to a switched-Ethernet network. The traffic on the port that the phone is connected to needs to be mirrored to the port that the desktop is connected to. Most, if not all, modern Ethernet switches support port mirroring (e.g., SPAN/R-SPAN on Cisco).
2. The second is to use a hub (an Ethernet hub does not do any traffic limiting and all ports on a hub see all the traffic on the hub). The hub may be where all phones and desktops are connected to or may be a 2/4-port hub connected downstream from the network to which the desktop and phone are connected.
3. The third utilizes technology that VoIP phones include—e.g., the Avaya IP-1150 has a keypad setting that will fork its VoIP (signaling and RTP) traffic to a second network port. This port would need to be connected to the desktop using an additional Ethernet port on the desktop or using a hub connected to the desktop.

TDM hardphones: These instruments will be recorded using a connector cable that connects the modular telephone wire to a USB or Ethernet input on the desktop. The signal received on the desktop contains in/out-of-band signaling and voice and this will be used to start and stop recording based on the signal.

2. Desktop Screen Capture

The agent's desktop or mobile computing device is recorded as a video file during a telephone or electronic interaction with a third party when the interaction begins. In the case of a phone call, the recording begins when the agent answers an incoming phone call or when they initiate an outbound phone call. In the case of an electronic interaction (such as email, chat or social media) the recording begins when the agent initiates the interaction (such as clicking on reply to an email, opening a chat window or adding a comment to a social media site.

The video (screen-capture) recording is made in a proprietary format that minimizes storage and bandwidth requirements. In order to manage network bandwidth usage, some parameters of the video recording format such as the screen color quality (e.g., 2, 4, 8, 16, 32-bit) are configurable with larger quality settings requiring more bandwidth. The screen is divided into horizontal strips or into a grid of rectangles. Each strip/rectangle is evaluated at a pre-defined time interval to detect changes and if a change is detected using a binary difference algorithm, the strip/rectangle is captured and included in the recording with coordinate and time information. At another pre-defined interval, the entire screen is captured (i.e., key frame) in order to allow faster seek times during playback.

3. Desktop Data Collection

The DDRC collects data from the agent's activity summary and detail levels. Summary level information includes a list of all of the windows that the agent brings into focus on the desktop or mobile computing device including the window name, in focus date and time, out of focus data and time. Detail level information includes a configurable list of all fields, buttons and links that the agent interacts with while the window is in focus. The detail includes the content name (such as button name, field name or link name), date and time of the activity, and in the event that the agent enters data into a field, the content that was entered is collected as well. Other desktop data that may be recorded includes keyboard, mouse, or other inputs made via other input devices (e.g., tablet).

Data recording may proceed differently depending on whether or not the agent is on a call. If the agent is not on a call, the collected data is uploaded and stored in a database for workflow analysis purposes. The database may be hosted locally on the agent's computer or remotely, such as on the DDR server 102. If the agent is on a call, a sub-set of the data (based on configurations that is customer-wide with individual or group exceptions) may be forwarded to the database for storage as tag data for that call. Since the call is being recorded on the desktop while the data is collected, the call information is forwarded to the database along with the data or correlating with that call.

4. Recording Stop and Start

These events are broken into two distinct sets of workflows: (1) Starting and Stopping recordings for either a telephone interaction or other interaction type and (2) Pausing and Resuming in progress recordings for security and privacy requirements.

Starting and Stopping: The client will be configured to begin recording an interaction for both telephone (in lieu of CTI) or other interactions in order to create recordings accessible in other applications, such as a coaching/analysis application for quality and coaching purposes.

Based upon pre-configured requirements, all recording and data collection can be paused while the agent is viewing or entering sensitive data (such as credit card numbers or social security numbers) based on the window, screen or field that is currently active. The recording and data collection will resume when the agent is no longer viewing or entering the sensitive data.

These functionalities are available for internally-triggered and externally-triggered recordings. Internally triggered recordings are described above. Note that the events that trigger a recording may also be events that are used for collecting data as described in the earlier sections. Externally triggered recordings include coaching clips, agent on-demand and supervisor on-demand. Coaching clips are triggered by a hooks within a web-page that request the start recording and stop recording and provide the end-point to which the recorded media is to be uploaded; agent on-demand calls are also triggered by hooks within another similar web-page; supervisor on-demand recordings are triggered by a web-page being viewed by another user (a supervisor).

Pausing and Resuming: When a recording in progress is paused and/or resumed, the events described in the section above for data collection are used. From the time that the recording is paused to when it is resumed, the application inserts silence packets into the audio recording and blank screens into the video recording. This is useful in visualizing the duration that the recording was paused. An enhancement to obfuscate (by blocking out or making fuzzy) the area around the mouse and/or cursor or the entire window would then allow the video recording to continue during the paused duration. This method to provide data-security/privacy compliance (e.g., PCI or HIPAA rules that require protection of sensitive data) prevents sensitive data from being recorded in the system. During period between the pause and resume, data is not collected and therefore not stored whereas events are collected and stored.

5. Data Storage

Upon the conclusion of an agent's third party interaction, the application stores all of the data recorded and collected and stores the metadata as a single interaction for future review and analysis. The DDRC is aware of the client desktop's connectivity to a network and the DDR server to be able to ensure that all data that is collected can be uploaded successfully.

In the event that the client loses connectivity to the DDR server, the DDR client creates a cached or temporary copy of the recording and metadata and will periodically poll the server. Upon successful re-connection to the server, the client shall upload all of the cached/temporary interactions. During the recording process, the DDR client caches all recording activity to a local file that ensures that if the agent desktop crashes, the interactions are preserved and uploaded once the agent's desktop is functional. All cached/temporary data is permanently deleted from the client desktop upon successful upload to the server.

In some embodiments, the DDR server stores a schedule that defines when or how frequently recordings for a particular agent or agent computer are to be stored. The DDR server receives a request from a DDR client that indicate a new recording is available for upload. Upon receipt of the request, the server determines the status of the agent's recording schedule and accepts or rejects the upload based on whether or not the interaction is needed to satisfy the schedule parameters. In the event that the interaction is not needed per the schedule parameters, the server will still accept the upload of the associated metadata and will reject the audio and/or video content.

6. Rules-based Configuration

The described system is in this embodiment configured based on rules. The rules define the events to use for specific actions. Note that while the rules are defined for actions and adding data as tags to a call, data collection does not require rules, although rules may be used to limit the amount of data forwarded for database storage.

The following are events that may be used or referenced by rules:

1. Window opening, closing, minimizing, maximizing, bringing in-focus/out-of-focus.
2. Application start, end (note that these may correspond to window opening or closing).
3. Selection of an element on a window (e.g., button, menu, data entry field) or a browser (e.g., button, menu, data entry field) or a main-frame emulation screen (screen, field)
4. Matching of text on a window element (e.g., in the body of a window, in the title bar, in a field) or a browser (e.g., URL, data entry field) or main-frame emulation screen (e.g., screen title, text in screen, field data)
5. Entry of data into a field on a window or browser or main-frame emulation screen.
6. Entry or exit from a field that allows/contains data in a window or browser or main-frame emulation.
7. For windows, a field or data-element would be unique to a window/application; for browsers it would be unique to a URL and for main-frame emulation screens it would be to a specific screen.
8. Note that for some classes of applications only the window can be detected and not anything within it—e.g., java applications.

The following actions may be used (these actions may be used in combinations with each other for the same event) or referenced by rules:

1. Log—log the event
2. Store—forward data for database storage
3. Tag—forward data for storage as a tag for the currently-being-recorded call—requires tag information
4. Pause—pause a recording currently in progress (if a recording is already paused, there is no action)
5. Resume—resume a recording (if a recording is not paused, there is no action)
6. Start recording—start screen and/or voice recording
7. Stop recording—stop screen and/or voice recording Rules are defined to identify the event and its corresponding action and are organized in hierarchical manner to identify the application, screen, section, sections, field, and so on.

7. Additional Features and Considerations

Some embodiments may be configures to create an e-learning clip based on data recorded at the agent's desktop by the DDRC. In other embodiments, supervisor on-demand recording may be provided, such that a supervisor can initiate an audio and video recording for any agent that they have a hierarchical relationship with at any time. In further embodiments, a supervisor can initiate a live video feed of an agent's desktop for any agent that they have a hierarchical relationship with at any time.

Figure 2A:
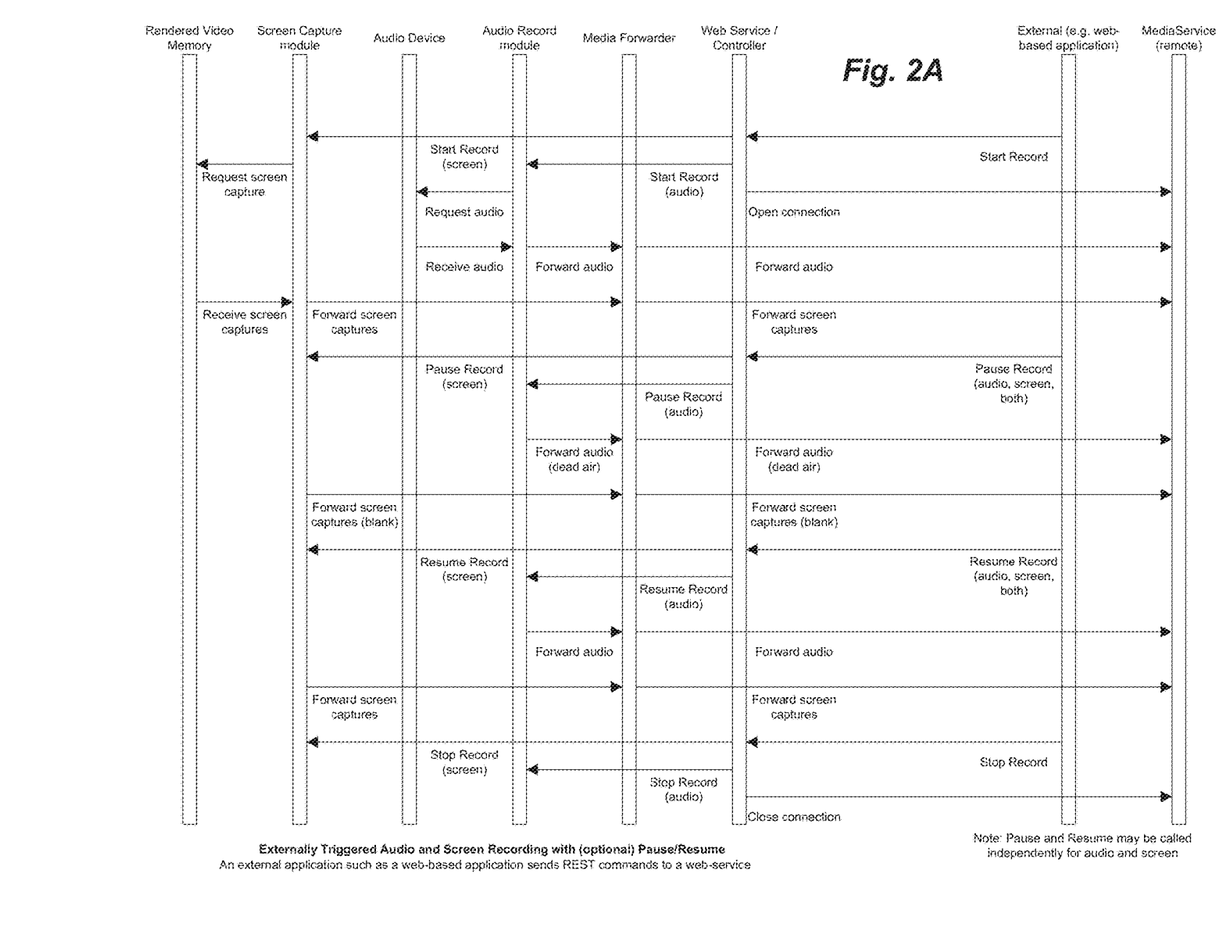
FIGS. 2A-2C are block diagrams illustrating module activation and interaction according to an example embodiment.
Figure 2B:
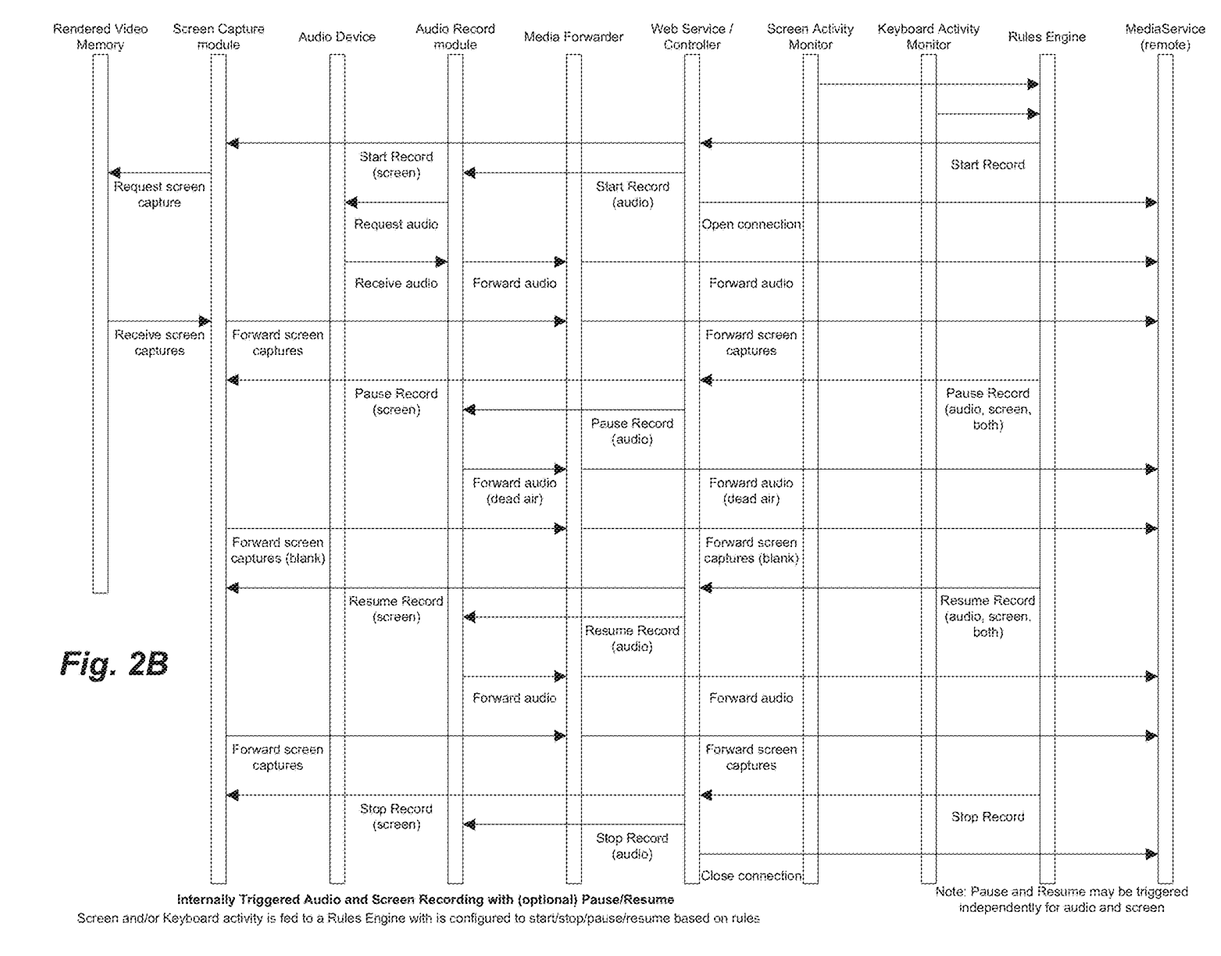
Figure 2C:
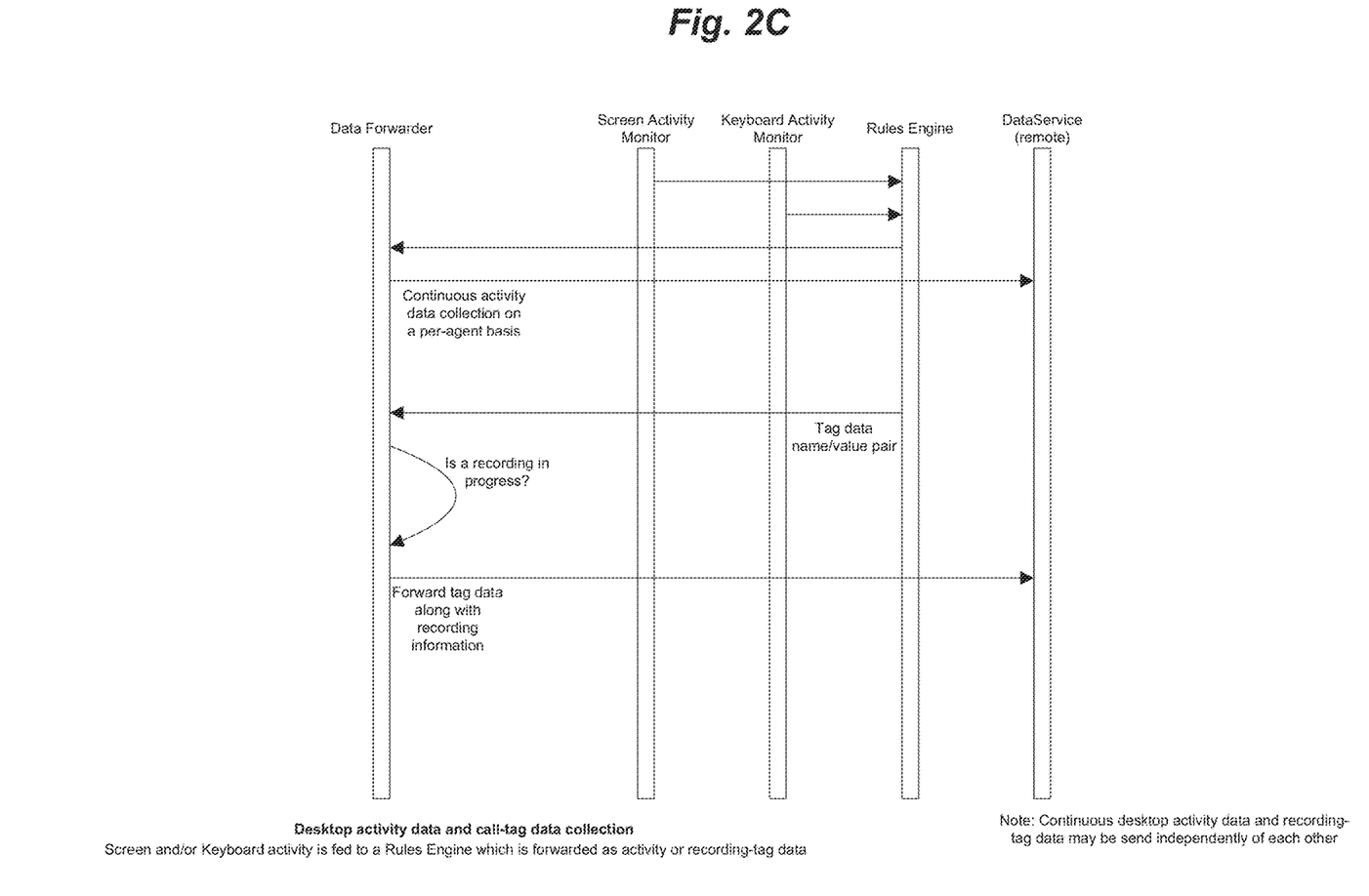

FIGS. 2A-2C are block diagrams illustrating module activation and interaction according to an example embodiment. In particular, FIG. 2A illustrates external processes for recording and data collection. In the preferred embodiment, the modules depicted in FIG. 2A are part of the agent's desktop computer (e.g., rendered video memory, audio device), the DDRC (e.g., screen capture module, audio record module, media forwarder, controller), and remote systems (e.g., MediaService).

FIG. 2B illustrates internal processes for recording and data collection. As discussed with respect to FIG. 2B, the illustrated modules are executing on the agent's computer and/or a remote system. For example, the Rules Engine may be part of the DDR client (on the agent's computer) or may be part of the DDR server or some other remote system.

FIG. 2C illustrates data only processes for data collection. The illustrated interactions are performed to collect interaction data (e.g., keystrokes, window names, field names). The components of the DDRC reside on (i.e., run or execute on) the agent's computer and use connections as needed to any type of telephony equipment.

Figure 2D:
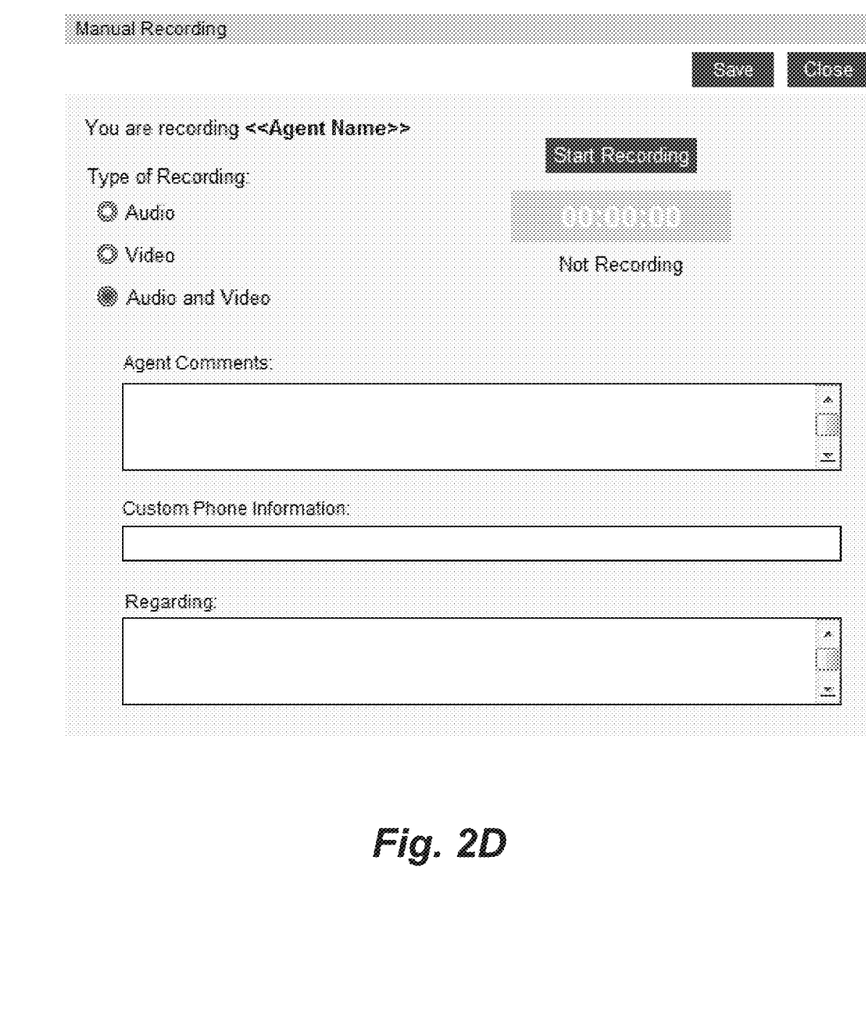
FIGS. 2D-2F are example user interface screens according to an example embodiment.
Figure 2E:
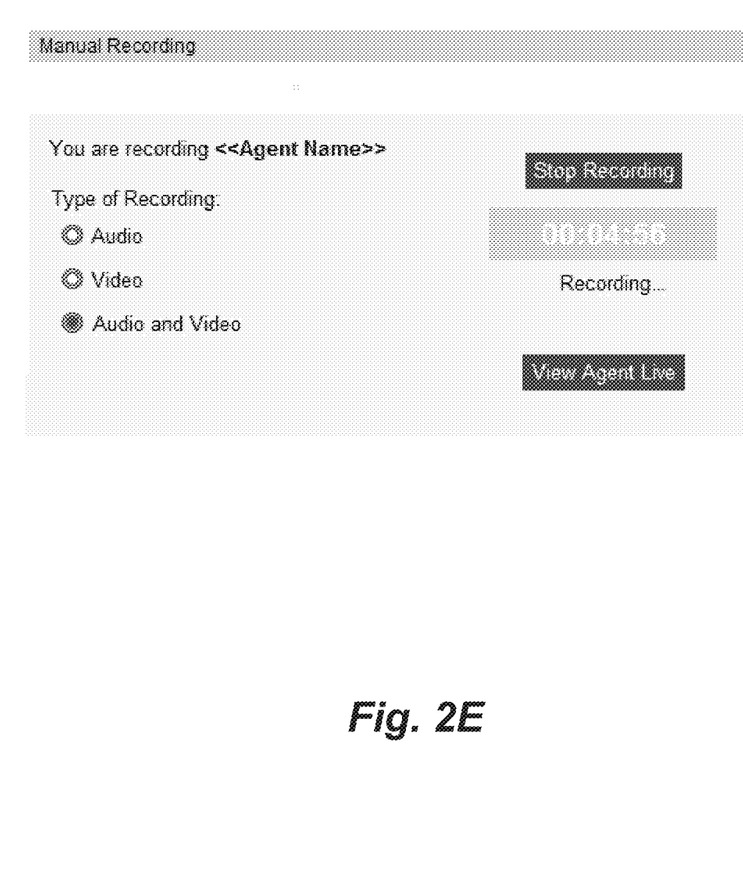
Figure 2F:
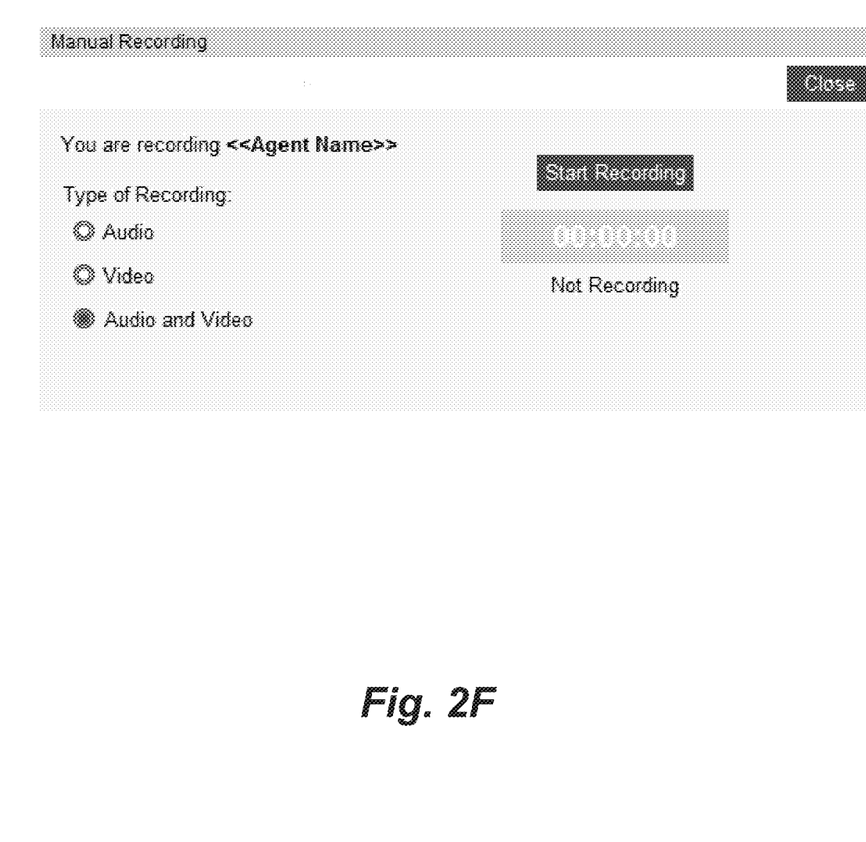

FIGS. 2D-2F are example user interface screens according to an example embodiment. The illustrated user interface screens may be presented by the DDRC according to an example embodiment.

FIG. 2D depicts an example dialog configured to initiate on-demand recording by an agent or some other party, such as a supervisor. The illustrated dialog includes controls to start recording, specify the type of recording (e.g., audio, video, both), and specify metadata such as comments, phone number, and other information.

FIG. 2E depicts an example dialog that is presented while recording is in progress. The illustrated dialog shows the type of recording, the length of the current recording, and includes controls for stopping the recording and viewing the agent live (e.g., by a supervisor).

FIG. 2F depicts another example dialog configured to initiate on-demand recording by an agent or some other party, such as a supervisor. FIG. 2F is a simplified version of FIG. 2D and illustrates the ability to allow the person requesting the on-demand recording to add additional information (FIG. 2D) or allow the system to record with minimal input from the requestor.

B. Example Processes

FIGS. 3.1-3.6 are example flow diagrams of data recording processes performed by example embodiments.

Figure 31:
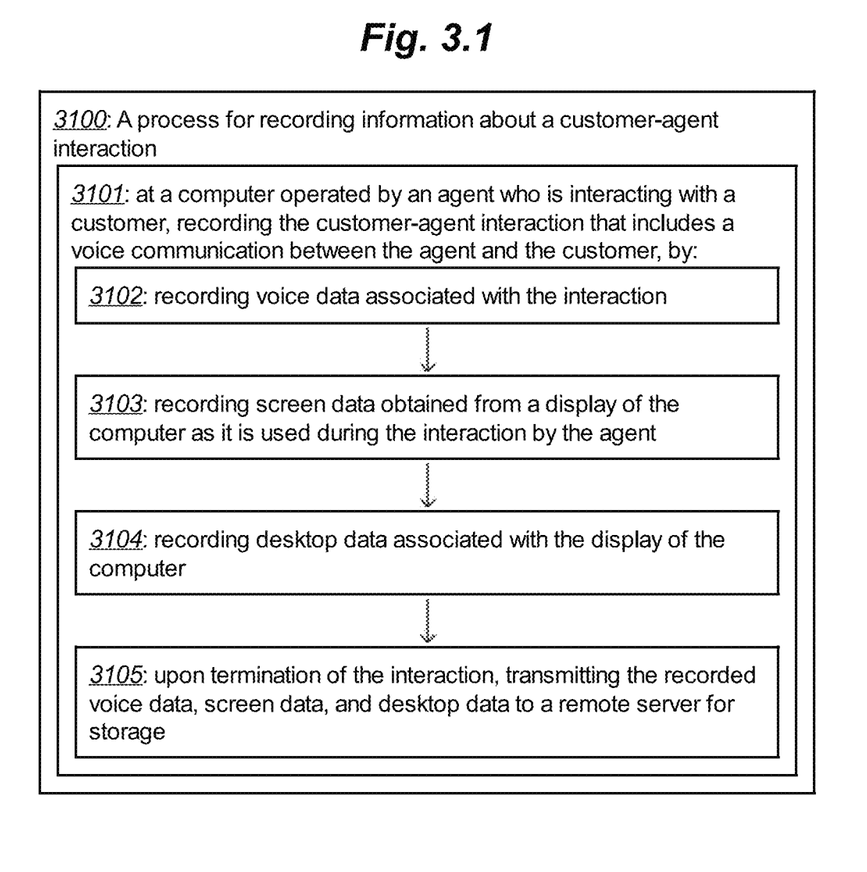

FIG. 3.1 is an example flow diagram of example logic for recording information about a customer-agent interaction. The illustrated logic in this and the following flow diagrams may be performed by, for example, the desktop data recording client 100 described with respect to FIG. 1, above. More particularly, FIG. 3.1 illustrates a process 3100 that includes operations performed by or at the following block(s).

At block 3101, the process performs at a computer operated by an agent who is interacting with a customer, recording the customer-agent interaction that includes a voice communication between the agent and the customer, by: performing operation(s) of block(s) 3102, 3103, 3104 and 3105, described below. The recording may be initiated manually or automatically, such as via a rule or trigger, as discussed herein.

At block 3102, the process performs recording voice data associated with the interaction. The voice data is typically audio data that is obtained from or via a telephone that is operated by the agent, although in other embodiments, it may be obtained from other sources, such as an audio chat.

At block 3103, the process performs recording screen data obtained from a display of the computer as it is used during the interaction by the agent. The screen data is typically image data obtained from a screen buffer or other display device of the agent's computer. As discussed, the data may be compressed, such as by only recording blocks or portions of the screen that change over time.

At block 3104, the process performs recording desktop data associated with the display of the computer. The desktop data is distinct from the screen data and typically includes higher level data associated with the display, such as window names, field entry data, keystrokes, or the like.

At block 3105, the process performs upon termination of the interaction, transmitting the recorded voice data, screen data, and desktop data to a remote server for storage. The remote server may be, for example, the DDR server 102 described with reference to FIG. 1.

Figure 32:
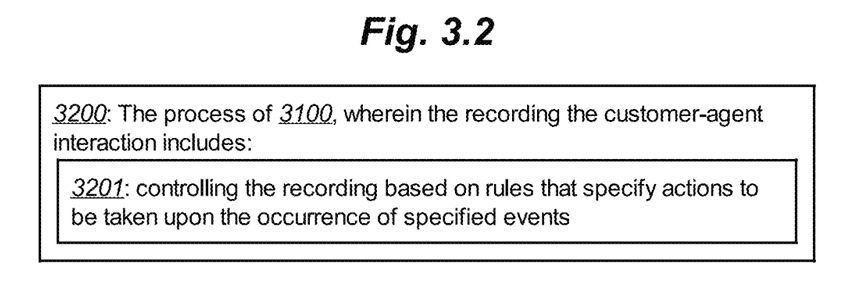

FIG. 3.2 is an example flow diagram of example logic illustrating an example embodiment of process 3100 of FIG. 3.1. More particularly, FIG. 3.2 illustrates a process 3200 that includes the process 3100, wherein the recording the customer-agent interaction includes operations performed by or at one or more of the following block(s).

At block 3201, the process performs controlling the recording based on rules that specify actions to be taken upon the occurrence of specified events. As discussed above, rules may be specified that define actions to take upon the occurrence of particular events, such as window events, user interface element interactions, call initiation, URL or network accesses, or the like.

Figure 33:
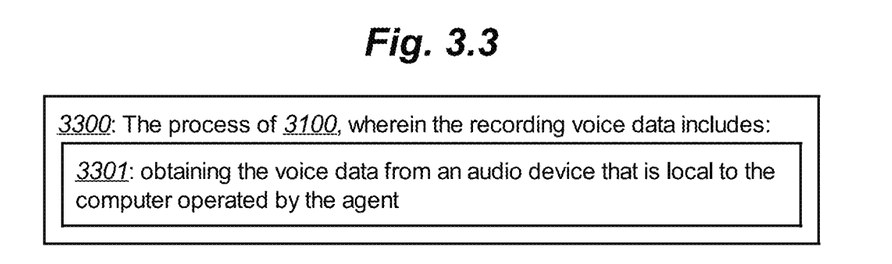

FIG. 3.3 is an example flow diagram of example logic illustrating an example embodiment of process 3100 of FIG. 3.1. More particularly, FIG. 3.3 illustrates a process 3300 that includes the process 3100, wherein the recording voice data includes operations performed by or at one or more of the following block(s).

At block 3301, the process performs obtaining the voice data from an audio device that is local to the computer operated by the agent. The audio device may be a soft phone (e.g., a software module executing on the computer) or a physical (hard) phone that is coupled directly or indirectly to the computer.

Figure 34:
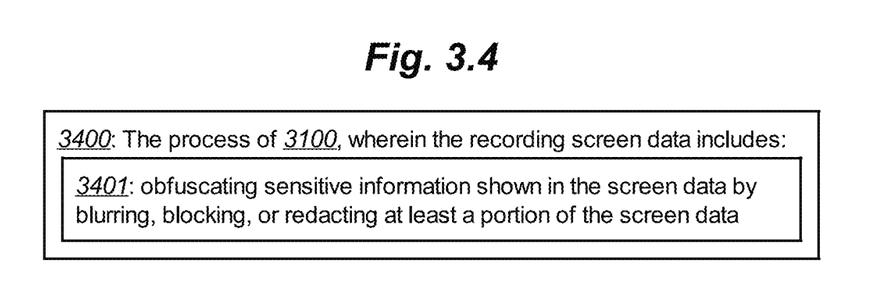

FIG. 3.4 is an example flow diagram of example logic illustrating an example embodiment of process 3100 of FIG. 3.1. More particularly, FIG. 3.4 illustrates a process 3400 that includes the process 3100, wherein the recording screen data includes operations performed by or at one or more of the following block(s).

At block 3401, the process performs obfuscating sensitive information shown in the screen data by blurring, blocking, or redacting at least a portion of the screen data. Some embodiments use an obfuscation technique, such as by blurring or blacking out portions of the screen that include sensitive information. For example, upon matching a field name (e.g., social security number entry field), the corresponding portion of the screen may be blacked out or otherwise obfuscated so that the entered number does not become part of the recorded interaction.

Figure 35:
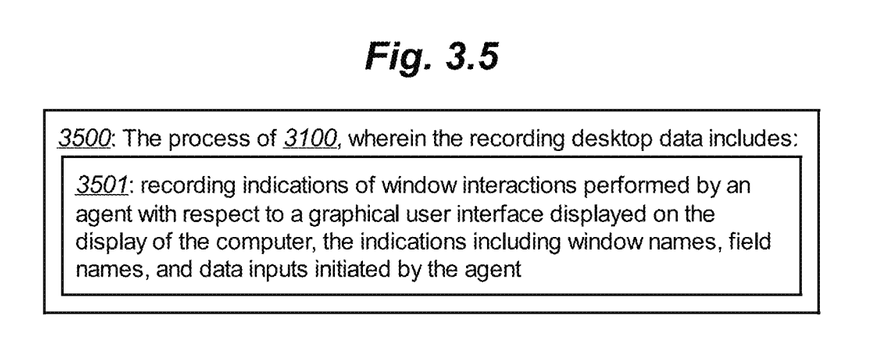

FIG. 3.5 is an example flow diagram of example logic illustrating an example embodiment of process 3100 of FIG. 3.1. More particularly, FIG. 3.5 illustrates a process 3500 that includes the process 3100, wherein the recording desktop data includes operations performed by or at one or more of the following block(s).

At block 3501, the process performs recording indications of window interactions performed by an agent with respect to a graphical user interface or a character-based data-entry/retrieval interface/emulator (e.g., TN3270) displayed on the display of the computer, the indications including window names, field names, and data inputs initiated by the agent. Recording this type of information allows the recorded interaction to be tagged, so that logical events (e.g., new customer information entry) can be associated with locations or times in the recorded interaction.

Figure 36:
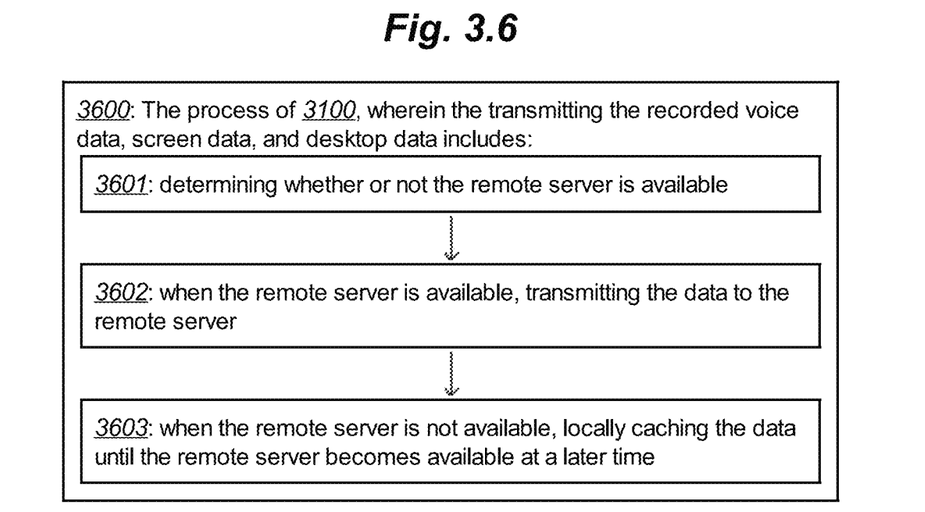

FIG. 3.6 is an example flow diagram of example logic illustrating an example embodiment of process 3100 of FIG. 3.1. More particularly, FIG. 3.6 illustrates a process 3600 that includes the process 3100, wherein the transmitting the recorded voice data, screen data, and desktop data includes operations performed by or at one or more of the following block(s).

At block 3601, the process performs determining whether or not the remote server is available.

At block 3602, the process performs when the remote server is available, transmitting the data to the remote server.

At block 3603, the process performs when the remote server is not available, locally caching the data until the remote server becomes available at a later time. After the recorded data is transmitted to the server, it is typically securely stored by the server and then deleted permanently from the agent's computer.

C. Example Computing System Implementation

Figure 4:
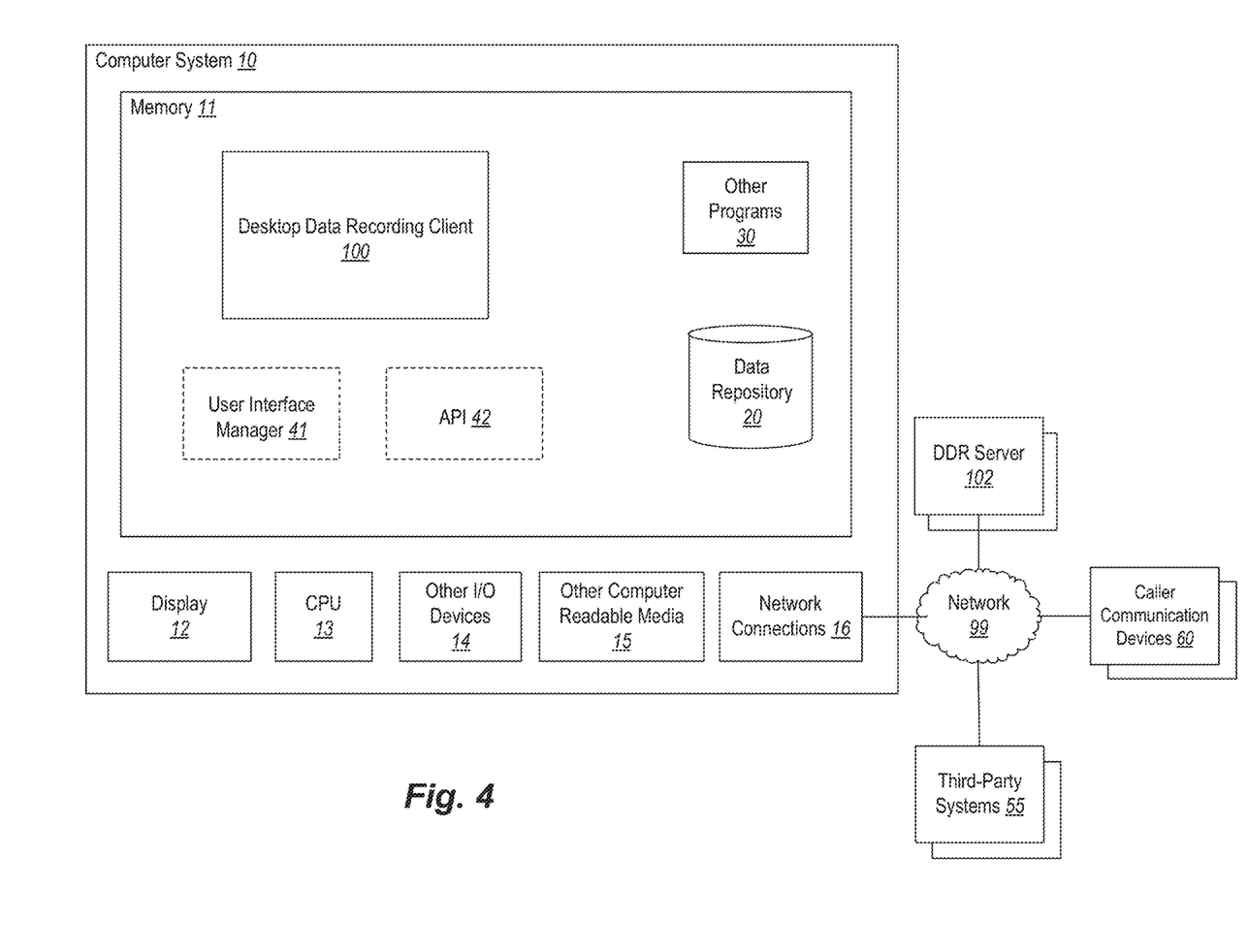
FIG. 4 is a block diagram of an example computing system for implementing a desktop data recording client according to an example embodiment.

FIG. 4 is a block diagram of an example computing system for implementing a desktop data recording client according to an example embodiment. In particular, FIG. 4 shows a computing system 10 that may be utilized to implement a DDRC 100. Also, at least some of the implementation techniques described below with respect to the DDRC 100 may be used to implement other devices, systems, or modules described herein, including the DDRS 102.

Note that one or more general purpose or special purpose computing systems/devices may be used to implement the DDRC 100. In addition, the computing system 10 may comprise one or more distinct computing systems/devices and may span distributed locations. Also, the computing system 10 may be a mobile computing device, such as a tablet computer, smart phone, laptop computer, or the like. In addition, the computing system 10 need not necessarily be located in a call center or other particular physical location. For example, in some embodiments, the computing system 10 may be a mobile device (e.g., smart phone) operated by an agent who is working at home, while traveling, or at some other location besides a physical call center. Furthermore, each block shown may represent one or more such blocks as appropriate to a specific embodiment or may be combined with other blocks. Also, the DDRC 100 may be implemented in software, hardware, firmware, or in some combination to achieve the capabilities described herein.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and network connections 16. The DDRC 100 is shown residing in memory 11. In other embodiments, some portion of the contents, some or all of the components of the DDRC 100 may be stored on and/or transmitted over the other computer-readable media 15. The components of the DDRC 100 preferably execute on one or more CPUs 13 and perform the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 4 may not be present in any specific implementation. For example, some embodiments may not provide other computer readable media 15 or a display 12.

The DDRC 100 is shown executing in the memory 11 of the computing system 10. Also included in the memory are a user interface manager 41 and an application program interface ("API") 42. The user interface manager 41 and the API 42 are drawn in dashed lines to indicate that in other embodiments, functions performed by one or more of these components may be performed externally to the DDRC 100.

The DDRC 100 interacts via the network 99 with DDR server 102, caller communication devices 60, and third-party systems/applications 55. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 55 may include any systems that provide data to, or utilize data from, the DDRC 100, including Web browsers, database systems, cloud-storage facilities, and the like.

The UI manager 41 provides a view and a controller that facilitate user interaction with the DDRC 100 and its various components. For example, the UI manager 41 may provide interactive access to the DDRC 100, such that users can interact with the DDRC 100, such as by initiating, pausing, resuming, or terminating recording, or by specifying rules or conditions that control the operation of the DDRC 100. In some embodiments, access to the functionality of the UI manager 41 may be provided via a Web server, possibly executing as one of the other programs 30. In such embodiments, a user operating a Web browser executing on a remote client device can interact with the DDRC 100 via the UI manager 41.

The API 42 provides programmatic access to one or more functions of the DDRC 100. For example, the API 42 may provide a programmatic interface to one or more functions of the DDRC 100 that may be invoked by one of the other programs 30 or some other module. In this manner, the API 42 facilitates the development of third-party software, such as user interfaces, plug-ins, adapters (e.g., for integrating functions of the DDRC 100 into Web applications), and the like.

In addition, the API 42 may be in at least some embodiments invoked or otherwise accessed via remote entities, such as code executing on the DDR server 102, caller communication devices 60, and/or one of the third-party systems/applications 55, to have the DDRC 100 perform one or more of its various functions. For example, the DDR server 102 may interact with the DDRC 100 via the API 42 in order to have the DDRC 100 send recorded data, or to refresh/download configuration rules, or the like.

In an example embodiment, components/modules of the DDRC 100 are implemented using standard programming techniques. For example, the DDRC 100 may be implemented as a "native" executable running on the CPU 13, along with one or more static or dynamic libraries. In other embodiments, the DDRC 100 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the DDRC 100, such as in the data store 20, can be available by standard mechanisms such as through C, C++, C#, and Java APIs; libraries for accessing files, databases, or other data repositories; through scripting languages such as XML; or through Web servers, FTP servers, or other types of servers providing access to stored data. The data stores 20 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the DDRC 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A method for recording information about a customer-agent interaction, the method comprising:
   at a computer operated by an agent who is interacting with a customer, recording the customer-agent interaction that includes a voice communication between the agent and the customer, by:
      recording voice data associated with the interaction;
      recording screen data obtained from a display of the computer as it is used during the interaction by the agent;
      recording desktop data that is associated with the display of the computer and that is distinct from the screen data; and
      upon termination of the interaction, transmitting the recorded voice data, screen data, and desktop data to a remote server for storage, wherein the transmitting the recorded voice data, screen data, and desktop data includes:
         determining whether the remote server is available;
         when the remote server is available, transmitting the data to the remote server; and
         when the remote server is not available, locally caching the data until the remote server becomes available at a later time.

2. The method of claim 1, wherein the recording the customer-agent interaction includes controlling the recording based on rules that specify actions to be taken upon the occurrence of specified events.

3. The method of claim 2, wherein the controlling the recording includes pausing the recording when the agent views or enters sensitive information, including personal identification number and/or account numbers.

4. The method of claim 2, wherein the actions include at least one of logging an event, storing an indication of the event at a remote location, associating a tag with the recording, pausing the recording, resuming the recording, starting the recording and stopping the recording.

5. The method of claim 2, wherein the events include at least one of:
   window opening, closing, maximizing, minimizing, or focus;
   application start or stop;
   window element selection;
   mainframe screen or field selection;
   matching text to window element;
   data entry into a field or other element;
   entry or exit into a window or field; and
   URL access.

6. The method of claim 1, wherein the recording voice data includes obtaining the voice data from an audio device that is local to the computer operated by the agent.

7. The method of claim 1, wherein the recording voice data includes obtaining the voice data from a soft phone application executing on the computer operated by the agent.

8. The method of claim 1, wherein the recording voice data includes obtaining the voice data from a network switch that mirrors voice data transiting the network switch to a voice over IP hard phone operated by the agent.

9. The method of claim 1, wherein the recording voice data includes obtaining the voice data from a network hub that broadcasts voice data transiting the network hub to the computer and to a voice over IP hard phone operated by the agent.

10. The method of claim 1, wherein the recording voice data includes obtaining the voice data from a direct connection between the computer and a voice over IP hard phone operated by the agent.

11. The method of claim 1, wherein the recording voice data includes recording silence packets as the voice data when the recording is paused because sensitive information is being discussed.

12. The method of claim 1, wherein the recording screen data includes obfuscating sensitive information shown in the screen data by blurring, blocking, or redacting at least a portion of the screen data.

13. The method of claim 1, wherein the recording desktop data includes recording mouse information, keystroke information, and window information associated with the interaction.

14. The method of claim 1, wherein the recording desktop data includes recording indications of window interactions performed by an agent with respect to a graphical user interface displayed on the display of the computer, the indications including window names, field names and data inputs initiated by the agent.

15. The method of claim 1, wherein the transmitting the recorded voice data, screen data, and desktop data includes upon transmitting the data to the remote server, permanently deleting the data from the computer.

16. A non-transitory computer-readable medium including contents that are configured, when executed, to cause a computing system to perform a method for recording a customer-agent interaction, the method comprising:
  at a computer operated by an agent who is interacting with a customer, recording the customer-agent interaction that includes a voice communication between the agent and the customer, by:
    recording voice data associated with the interaction;
    recording screen data obtained from a display of the computer as it is used during the interaction by the agent;
    recording desktop data that is associated with the display of the computer and that is distinct from the screen data; and
    upon termination of the interaction, transmitting the recorded voice data, screen data, and desktop data to a remote server for storage,
  wherein the remote server is configured to
    store a schedule that specifies when recordings for an agent are to be stored;
    receive from the module a request that indicates that a new recording is available for upload;
    determine whether the recording is needed to satisfy the schedule;
    when the recording is needed, accept and store the recording on the server; and
    when the recording is not needed, accept and record on the server metadata associated with the recording, and reject at least one of the recorded voice data, screen data, and desktop data.

17. A system for recording a customer-agent interaction, the system comprising:
  a processor;
  a memory; and
  a module that is stored in the memory and that is configured, when executed by the processor, to:
    record the customer-agent interaction that includes a voice communication between the agent and the customer, by:
      recording voice data associated with the interaction;
      recording screen data obtained from a display of the computer as it is used during the interaction by the agent;
      recording desktop data that is associated with the display of the computer and that is distinct from the screen data; and
      upon termination of the interaction, transmitting the recorded voice data, screen data, and desktop data to a remote server for storage,
    wherein the remote server is configured to
      store a schedule that specifies when recordings for an agent are to be stored;
      receive from the module a request that indicates that a new recording is available for upload;
      determine whether the recording is needed to satisfy the schedule;
      when the recording is needed, accept and store the recording on the server; and
      when the recording is not needed, accept and record on the server metadata associated with the recording, and reject at least one of the recorded voice data, screen data, and desktop data.

18. The system of claim 17, wherein the module is further configured to record silence packets as the voice data when the recording is paused because sensitive information is being discussed.

* * * * *